US010055578B1

(12) United States Patent
Marquardt et al.

(10) Patent No.: US 10,055,578 B1
(45) Date of Patent: Aug. 21, 2018

(54) SECURE SOFTWARE CONTAINERS

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Carl J. Persson, Olathe, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 15/157,031

(22) Filed: May 17, 2016

(51) Int. Cl.
*G06F 21/44* (2013.01)
*G06F 21/53* (2013.01)
*G06F 21/60* (2013.01)
*H04L 29/06* (2006.01)

(52) U.S. Cl.
CPC ............. *G06F 21/53* (2013.01); *G06F 21/44* (2013.01); *G06F 21/602* (2013.01); *H04L 63/14* (2013.01)

(58) Field of Classification Search
None
See application file for complete search history.

(56) References Cited

U.S. PATENT DOCUMENTS

| | | | | |
|---|---|---|---|---|
| 5,864,620 A * | 1/1999 | Pettitt | ..................... | G06F 21/10 705/320 |
| 6,836,888 B1 * | 12/2004 | Basu | ....................... | G06F 21/57 713/164 |
| 8,234,640 B1 * | 7/2012 | Fitzgerald | ............... | G06F 21/53 718/1 |
| 9,086,917 B1 * | 7/2015 | Fitzgerald | ................. | G06F 8/60 |
| 9,282,898 B2 | 3/2016 | McRoberts | | |
| 9,459,912 B1 * | 10/2016 | Durniak | .............. | G06F 21/6218 |
| 9,524,389 B1 * | 12/2016 | Roth | .................... | G06F 21/554 |
| 2003/0097422 A1 * | 5/2003 | Richards | .................. | G06F 8/61 709/217 |
| 2007/0245348 A1 * | 10/2007 | Araujo, Jr. | .............. | G06F 21/53 718/1 |
| 2008/0134175 A1 * | 6/2008 | Fitzgerald | ........... | G06F 9/45533 718/1 |
| 2011/0214176 A1 * | 9/2011 | Burch | ..................... | G06F 9/455 726/15 |

(Continued)

*Primary Examiner* — Malcolm Cribbs

(57) ABSTRACT

A computer system that comprises a processor, a non-transitory memory, and a system application stored in the non-transitory memory. When executed by the processor, the application receives a request to create a software container, creates the container, generates a signature of the container, creates a container security token that comprises the signature and embeds the container security token in the container, and returns the container with the embedded container security token. The application receives a request to launch an application in the container, determines a confirmation signature of the container provided by the application launch request, compares the confirmation signature to the signature of the container security token in the container, determines that the confirmation signature and the signature of the container security token in the software container match, and responsive to determining the signatures match launches the application in the software container provided by the application launch request.

18 Claims, 9 Drawing Sheets

(56) References Cited

U.S. PATENT DOCUMENTS

| | | | |
|---|---|---|---|
| 2012/0054829 A1* | 3/2012 | Holostov | G06F 21/53 |
| | | | 726/3 |
| 2012/0084262 A1* | 4/2012 | Dwarampudi | G06F 11/1448 |
| | | | 707/667 |
| 2013/0061314 A1* | 3/2013 | De Atley | G06F 21/53 |
| | | | 726/17 |
| 2014/0040997 A1* | 2/2014 | Anantharaju | G06F 21/53 |
| | | | 726/5 |
| 2015/0033221 A1* | 1/2015 | Chari | H04L 63/105 |
| | | | 718/1 |
| 2015/0254451 A1* | 9/2015 | Doane | G06F 21/44 |
| | | | 726/1 |
| 2015/0324219 A1* | 11/2015 | Fitzgerald | G06F 8/60 |
| | | | 718/1 |
| 2016/0342786 A1* | 11/2016 | Gerebe | G06F 21/52 |
| 2017/0052807 A1* | 2/2017 | Kristiansson | G06F 9/54 |
| 2017/0093578 A1* | 3/2017 | Zimmer | G06F 9/226 |
| 2017/0154017 A1* | 6/2017 | Kristiansson | G06F 17/2247 |
| 2017/0180346 A1* | 6/2017 | Suarez | H04L 63/083 |

* cited by examiner

10,055,578 B1

SECURE SOFTWARE CONTAINERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software containers are execution frameworks that support independent execution of applications on top of a single operating system. Software containers can provide significant execution efficiencies, relative to traditional virtualization layers, while still isolating applications and promoting dynamic scaling. A first application executing in a first container is separated from and unaware of a second application executing in a second container on the same host computer. Software containers may be provided as an operating system construct or object. Said in another way, software containers may be created and applications launched for execution in the software containers through application programming interface (API) calls or system calls to the operating system on a host computer.

SUMMARY

In an embodiment, a computer system is disclosed. The computer system comprises a processor, a non-transitory memory, and a system application stored in the non-transitory memory. When executed by the processor, the system application receives a request to create a software container, creates the software container, generates a signature of the software container, creates a container security token that comprises the signature, embeds the container security token in the software container, and returns the software container with the embedded container security token. The system application further receives a request to launch an application in the software container, where the request comprises the software container, determines a confirmation signature of the software container provided by the application launch request, compares the confirmation signature to the signature of the container security token in the software container provided by the application launch request, determines that the confirmation signature and the signature of the container security token in the software container provided by the application launch request match, and responsive to determining the signatures match launches the application in the software container provided by the application launch request.

In an embodiment, a method of providing an execution environment with a software container is disclosed. The method comprises creating a software container comprising a container security token by a system application executing on a computer system, where the token comprises a signature of the software container and an identity of an application and receiving a request by the system application to launch an application in the software container that identifies the software container and identifies the application. The method further comprises determining a confirmation signature of the identified software container by the system application, comparing the confirmation signature to the signature in the container security token by the system application, comparing the application identity provided in the request to launch the application in the software container to the application identity in the container security token by the system application, and, in response to determining that the confirmation signature matches the signature in the container security token and to determining that the application identity provided in the request to launch the application matches the application identity in the container security token, launching execution of the application in the software container by the system application.

In an embodiment, a method of providing a software service is disclosed. The method comprises executing a service application in a software container on a computer system, where the service application provides a software service to client applications external to the computer system, receiving a service request from a client application to access the software service provided by the service application, where the service request comprises a service security token, validating the service security token by the service application, and, in response to validating the service security token, performing the software service associated with the request from the client application by the service application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
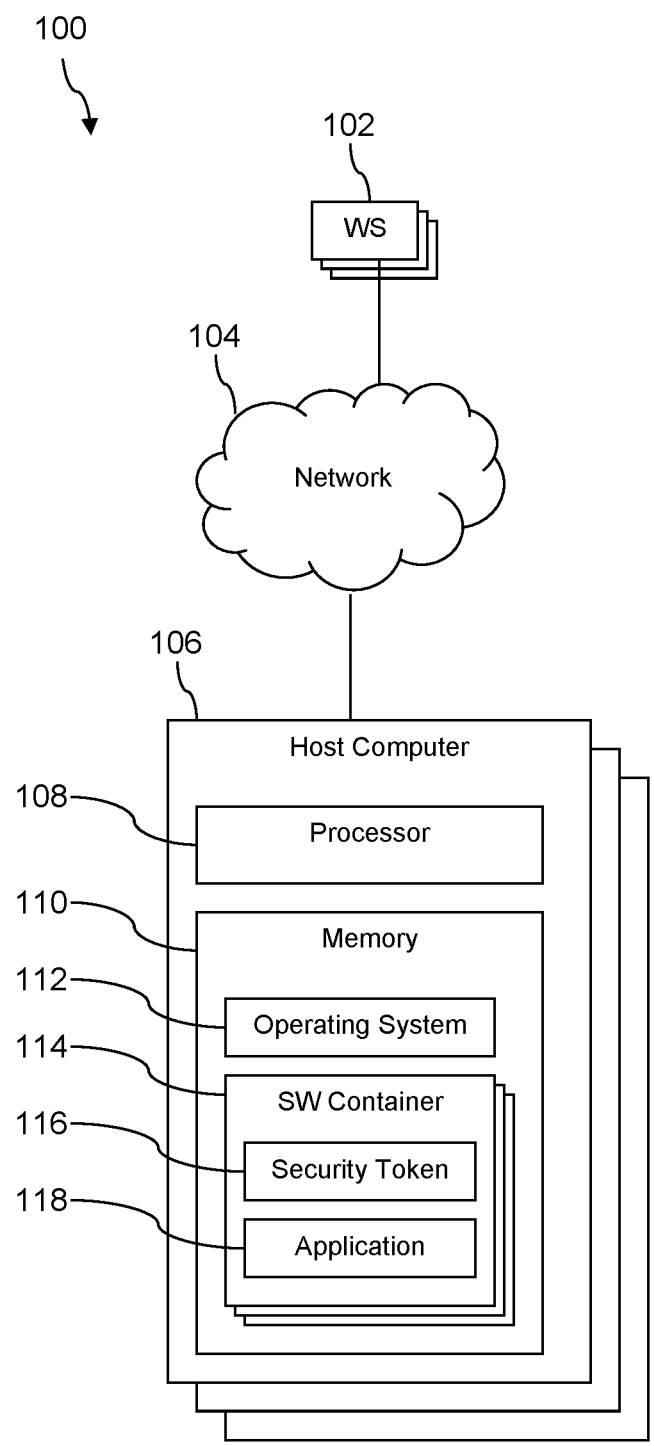
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Software containers are used to provide an environment for executing applications on a server computer or a host computer. More particularly, different software containers support independent execution environments for applications executing on the same host computer, such that an application executing in a first container is unaware of another application executing in a second container on the same host computer. Software containers provide many of the advantages of virtualization supported by a hypervisor that creates virtual machines in which separate applications execute. The typical hypervisor supported virtualization involves a virtual operating system executing in a virtual machine provided by the hypervisor and an application executing in the context of the virtual operating system. System calls from the application are mapped from virtual operating systems by the virtual machine to the actual operating system below the hypervisor or, alternatively, directly to machine instructions by the hypervisor. The use of the virtual operating system, however, is often associated with execution inefficiencies. Software containers typically can avoid these execution inefficiencies while still providing the desired inter-application isolation and elasticity of hypervisor driven virtualization.

The present disclosure teaches extending the software container construct to incorporate beneficial security mechanisms. These security mechanisms may be employed separately from each other, in some embodiments. Other embodiments may combine two or more of the security mechanisms. The process of executing applications in software containers entail requesting a software container from the operating system and then asking the operating system to launch an application in the previously obtained software container. This disclosure teaches building a security token at the same time the software container is created. The security token is built into or embedded in the software container. In an embodiment, the security token may be encrypted or a portion of the security token may be encrypted when it is created. When a request to launch an application in the previously created software container is received by the operating system, the security token is examined to determine if the application launch request is to be granted. If the security token does not validate for some reason, the application launch request is rejected.

The operating system may generate a signature that is uniquely or quasi-uniquely associated with a software container when it is created. This signature is built into the security token. When the operating system executing on a host computer is requested to launch an application in a previously created software container, the operating system examines the signature in the security token. If the signature does not pass inspection, the launch request is rejected. The signature may be formed based on a checksum calculated over the software container. The signature may be formed based on a hash value calculated over the software container. Each software container may comprise one or more container artifacts that the operating system relies upon to instantiate a software container for execution. The signature may be formed based in part on calculating a checksum or hash value over the container artifacts. When a request from a user is received, such as a request from a remote workstation, to execute an identified application in a software container, the operating system may recalculate the signature—e.g., determine a confirmation signature—and compare the confirmation signature to the signature stored in the software container. If the container has been tampered with, the confirmation signature may not match the signature stored in the security token, and the software container/application launch request may be rejected.

In an embodiment, a user request to create a software container may identify a specific application to be executed in the software container. The identity of the application may also be stored in the security token. The operating system may further validate the request to execute an application in a created software container by comparing the identity of the application provided in the launch request to the application identity stored in the security token. If the application identities do not match, the operating system may reject the request to launch the application in the software container.

In an embodiment, the operating system may create a time-to-live value when a software container is created and store the time-to-live value in the security token. If a request is received to launch an application in a software container, the operating system checks the time-to-live value and if out-of-date, the operating system may reject the request to launch the application in the software container. Thus, if the software container is too old, it may not be used. This may be useful in avoiding malware capturing and/or copying software containers and attempting to use them at a later date for malicious purposes. In an embodiment, the operating system may periodically check the time-to-live of security tokens of active software containers and terminate the application associated with a software container having an expired time-to-live value in its security token. Alternatively, the operating system may push a message to the application and/or to a user who requested the operating system to launch the application in the subject software container that provides an application programming interface (API) that can be used to extend the time-to-live value. In an embodiment, the time threshold for allowing a request to launch an application in a software container may be different from the time threshold for terminating a software container that has been executing an application for time. For example, the first time threshold may be 5 seconds while the second time threshold may be 8 hours.

This disclosure further teaches extending an application programming interface (API) construct to incorporate beneficial security mechanisms. These security mechanisms may be employed individually or in combination. A service application may execute in a software container and provide software services to client applications via one or more APIs of the software container. The client application may request a service security token associated with invoking one of the APIs of the service application, for example requesting the service security token from a service token server. The service token server may first verify that the subject client application is authorized to invoke the requested API of the service application, for example verifying that the subject client application has registered to use the service application and has paid a subscription fee for access. The service token server may then create a service security token that comprises one or more of an API signature, a client application identity, and an API time-to-live value. In an embodiment, the service security token may be encrypted. The service token server may then return a service API object that embeds or comprises the service security token to the client application. The API signature may be a unique or quasi-unique value determined by the service token server based on the service API object returned to the client application, for example a checksum or a hash value. The client application sends a request to access the services of the service application that comprises the service API object. The service application validates the service security token, and if the token validates provides the requested service to the client application.

It is appreciated that the security enhancements of the software containers construct may be combined in the same computer system with the security enhancements of the application programming interface construct. These enhancements can be considered to be improvements to computer technology as they increase the inherent security of the computer systems involved and reduce the exposure of these computer systems to a variety of potential cyber-attacks.

Turning now to FIG. 1, a communication system 100 is described. In an embodiment, the system 100 comprises one or more work stations 102, a network 104, and one or more host computers 106. The work stations 102 may be used to launch execution of applications on the host computers 106. The communication system 100 may correspond to a private computing system within an enterprise or organization. Alternatively, the communication system 100 may involve autonomous, unrelated users launching applications on the host computers 106 provided by a third party computing service company.

Each host computer 106 comprises a processor 108 and memory 110. The memory 110 may comprise both non-transitory memory and transitory memory. In an embodiment, a non-transitory portion of the memory 110 may store an operating system 112. When the host computer 106 executes, it may load the operating system 112 from a non-transitory portion of memory to a transitory portion of memory. The operating system 112 may provide system calls or application programming interface (API) calls that support the creation of software containers 114 and that support launching execution of an application 118 in the software container 114. In some contexts the operating system 112 may be referred to as a system application or as one of a plurality of system applications. As taught herein, when the operating system 112 creates the software container 114 it further creates an associated security token 116 that is built into or embedded in the software container 114.

Figure 2:
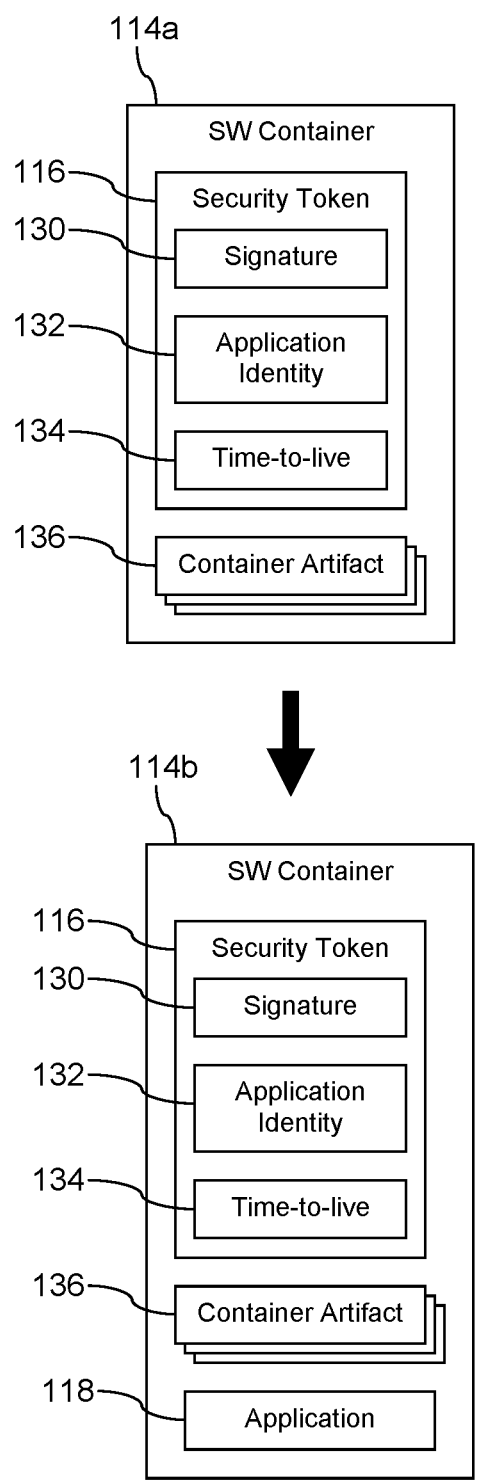
FIG. 2 is a block diagram of a software container according to an embodiment of the disclosure.

Turning now to FIG. 2, further details of the software container 114 are described. In an embodiment, a work station 102 may request the operating system 112 to create a software container 114 for the work station 102. The request is made via an application programming interface or a system call provided by the operating system 112. The request may involve providing an identity of an application to be launched in the software container 114. The operating system 112 may create the software container 114a in an initial, inactive state.

The inactive software container 114a comprises the security token 116 and a variety of container artifacts 136 that the operating system 112 may use to control and execute the container 114. For example, the container artifacts 136 may comprise information about resource allocations and/or resource size for use in initiating the software container 114. For example, the container artifacts 136 may comprise configuration information for use in initiating the software container 114. The security token 116 may comprise a signature 130, the application identity 132, and a time-to-live 134. In different embodiments, the security token 116 may comprise only one of the signature 130, the application identity 132, or the time-to-live 134. Alternatively, in an embodiment, the security token 116 may comprise two of the signature 130, the application identity 132, or time-to-live 134 or all three of these items.

The signature 130 may be calculated by the operating system 112 based on or over the inactive software container 114a. The signature 130 may comprise a checksum value, a hash value, or some other digital value calculated based on the inactive software container 114a. The signature 130 may be calculated over the container artifacts 136. The signature 130 may be calculated over the application identity 132. The signature 130 may be calculated over the container artifacts 136 and the application identity 132. The signature 130 may be calculated over the container artifacts 136, the application identity 132, and the time-to-live 134. The signature 130 may be calculated over any combination of two of the container artifacts 136, the application identity 132, and the time-to-live 134.

It is understood that the signature 130 is a value that is unique or quasi-unique to the specific inactive software container 114a the operating system 112 has created. As used herein, the term quasi-unique is used to indicate that the signature 130 may be created as a finite length bit string and hence may represent only a finite number of unique values. In infrequent instances, two different inactive software containers 114a may be created with an identical signature 130—and hence the signature 130 may be said to be quasi-unique. In an embodiment, the security token 116 may be encrypted. In an embodiment, the signature 130 of the security token 116 alone may be encrypted. Alternatively, an embodiment, the entire security token 116 may be encrypted.

After creating the software container 114a, the operating system 112 returns the inactive software container 114a to the requesting work station 102. The work station 102 may then send a request to execute an application in the inactive software container 114a to the operating system 112 through an application launch system call. The request comprises the inactive software container 114a and information for executing one or more applications in the inactive software container 114a. The information for executing comprises an identification of the one or more applications. The information may further comprise an address of an executable image of the application and/or applications where the operating system 112 can fetch the application image or images.

The operating system 112 performs security checks on the inactive software container 114a provided in the launch request. At a high level, the operating system 112 checks one or more of (A) has the inactive software container 114a been altered, (B) does the application identified in the launch request agree with the application identity stored in the security token 116, and/or (C) is the request timely. Failure to check-out for any of these checks may cause the operating system 112 to reject the launch request. The operating system 112 may verify that the inactive software container 114a has not been altered by calculating a confirmation signature based on and/or over the inactive software container 114a and comparing the confirmation signature to the signature 130 stored in the security token 116. If they do not match, the inactive software container 114a has likely been altered in some way, possibly altered by malware or an unauthorized work station 102. The operating system 112 compares the identity of the application supplied in the application launch request to the application identity stored in the security token 116. If they do not match, the inactive software container 114a may have been copied by an unauthorized user or application.

The operating system 112 may compare the time-to-live 134 to a current system time of the host computer 106. It will be appreciated that the time-to-live 134 may be implemented in a variety of different manners. The time-to-live 134 may designate a time at which the inactive software container 114a is to be considered expired or out-of-date. The time may be designated in any time format, for example a number of seconds elapsed from some conventional and understood epoch, such as midnight Jan. 1, 1970. Alternatively, some other conventional and understood epoch may be used. Alternatively, the time-to-live 134 may be set to a time at which the inactive software container 114a is created. If the operating system 112 determines that the inactive software container 114a is too old, the request to launch may be rejected, for example if the current system time is later than the time-to-live 134 or if the difference between the current system time and the time-to-live 134 exceeds a first threshold (e.g., in the case where time-to-live 134 records time of creation of the inactive software container 114a).

If the checks performed by the operating system 112 on the security token 116 are positive, the operating system 112 creates an active software container 114b that executes the application 118 in the active software container 114b. The operating system 112 or another application may periodically compare the time-to-live 134 of the security token 116 in active software containers 114b to determine if the time-to-live 134 is expired or if the difference between the current system time and the time-to-live 134 exceeds a second threshold. If the time-to-live 134 is deemed to be expired or too late, the operating system 112 may terminate execution of the application 118 and then destroy the active software container 114b. Alternatively, the operating system 112 may provide an application programming interface for use by the application 118 or the work station 102 to extend the time-to-live 134. For example, the operating system 112 may prompt the application 118 to invoke an API provided by the operating system 112 for use in extending the time-to-live 134.

In an embodiment, a daemon process associated with the operating system 112 and executing on the host computer 106 outside of any software container 114 may monitor and take action based on time-to-live 134 values of active software containers 114b associated with the subject host computer 106. For example, the daemon process may terminate an application 118 and destroy an active software container 114b when the time-to-live 134 is expired or instead prompt the application 118 to invoke a system call to extend the time-to-live 134. Alternatively, a controller process executing on a different server computer (not shown) may monitor and take action based on time-to-live 134 values of active software containers 114b associated with one or more host computers 106. For example, the controller process may terminate an application 118 and destroy an active software container 114b when the time-to-live 134 is expired or instead prompt the application 118 to invoke a system call to extend the time-to-live 134

Figure 3:
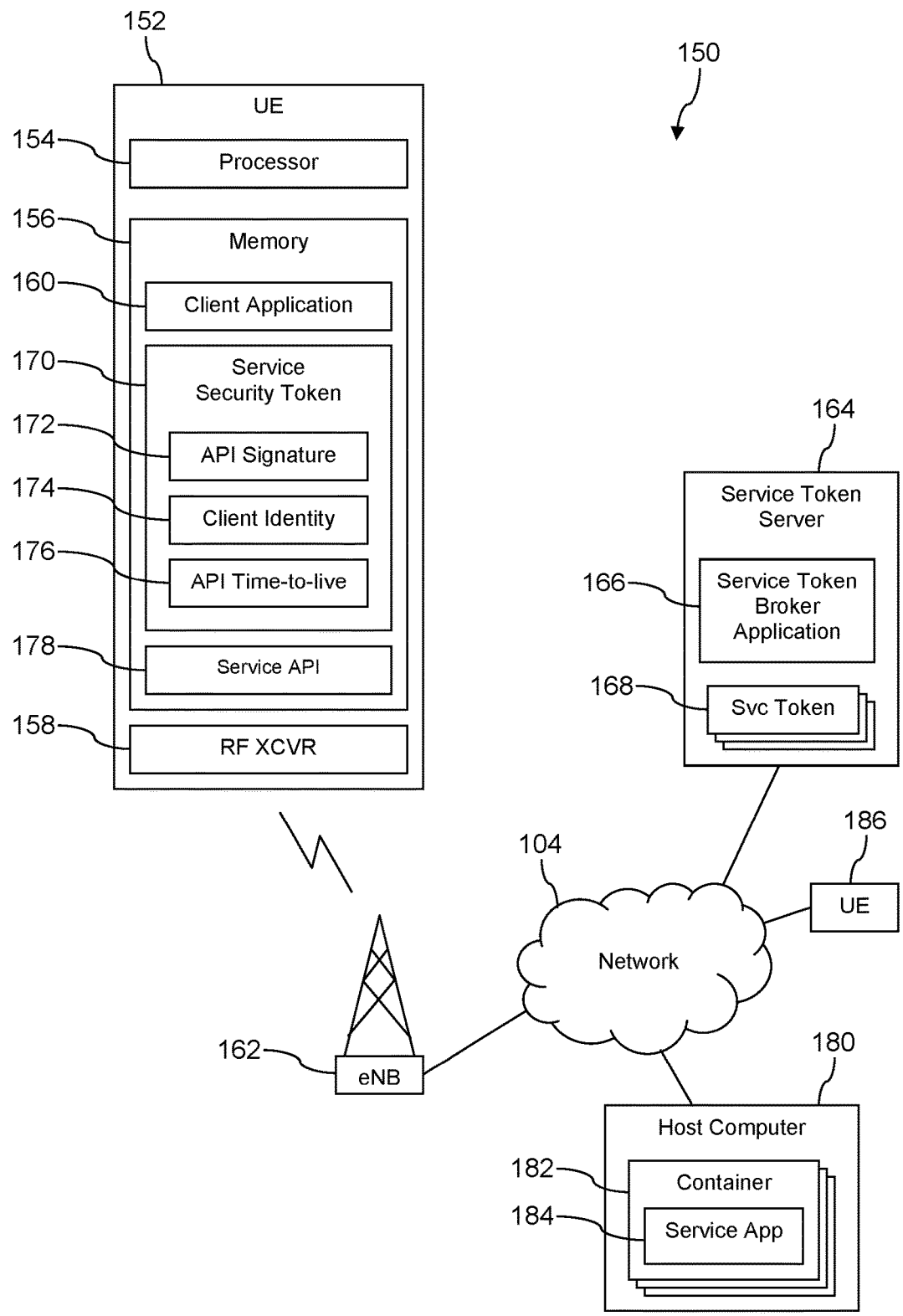
FIG. 3 is a block diagram of another communication system according to an embodiment of the disclosure.

Turning now to FIG. 3, a communication system 150 is described. In an embodiment, system 150 comprises a user equipment (UE) 152 that comprises a processor 154, a memory 156, and a radio transceiver 158. The memory 156 comprises a client application 160 that may be executed by the processor 154. The system 150 further comprises an enhanced node B (eNB) 162 that provides a wireless communication link to the UE 152 and links the UE 152 to the network 104. The eNB 162 may be referred to as a base transceiver station (BTS) or a cell tower and may provide a wireless communication link to the UE 152 according to one or more of a long term evolution (LTE), a code division multiple access (CDMA), a global system for mobile communication (GSM), or worldwide interoperability for microwave access (WiMAX) wireless communication protocol. The UE 152 may be a mobile phone, a smart phone, a personal digital assistant (PDA), a media player, a wearable computer, a headset computer, a laptop computer, a notebook computer, or a tablet computer. The system 150 may further comprise a UE 186 that communicates via a wired communication link to the network 104. The UE 186 may be a desktop computer, a set-top box, a TV tuner, or other generally stationary electronic device.

The system 150 further comprises a service token server 164 that executes a service token broker application 166 and manages a plurality of service security tokens 168. The system 150 further comprises a host computer 180 that executes a service application 184 in a software container 182. It is understood that the system 150 comprises any number of UEs 152, 186, eNBs 162, and host computers 180. The host computer 180 may provide a plurality of concurrent software containers 182 in which different applications execute or in which independent but like (i.e., based on same application image) applications execute.

In an embodiment, the UE 152, 186 may communicate with the service token server 164 and with the host computer 180 via an end-to-end trusted communication link or channel. For example, at least portions of the client application 160 may execute in a trusted security zone of the UE 152 when communicating with the service token broker application 166 executing on the service token server 164 and/or with the service application 184 executing in the software container 182 on the host computer 180. The client application 160 may perform some on-device processing in the trusted security zone of the UE 152 and may store a service security token 170 and/or a service API 178 in the trusted security zone of the UE 152. Trusted security zones are discussed further hereinafter.

When executed by the processor 154, the client application 160 may send a request for a service security token 168 to the service token server 164 via the eNB 162 and via the network 104. The request for the service security token 168 identifies a service API associated with the service application 184 that the UE 152 desires to invoke. The service token broker application 166 first verifies that the UE 152 is authorized to invoke the service API on the service application 184. For example, the service token broker application 184 may determine that the UE 152 is authorized to use the service application 184. For example, the service token broker application 184 may determine if the UE 152 is registered to use the subject service application 184 and/or if a user associated with the UE 152 has a service subscription associated with the service application 184 that is in good standing (i.e., paid-up or not in arrears).

If the UE 152 is deemed authorized to use the service application 184, the service token broker application 166 creates a service security token 168 for the UE 152. The service security token 168 may comprise one or more of an API signature, a client identity, and an API time-to-live. The service token broker application 166 stores a copy of the service security token 168 and sends a copy service security token 170 to the UE 152 via the network 104 and the eNB 162. The copy service security token 170 comprises one or more of an API signature 172, a client identity 174, and an API time-to-live 176. The service token broker application 166 further sends a service API 178 to the UE 152, for example an API object that may be used to invoke the service API on the service application 184.

The service token broker application 166 may create the API signature 172 based on a hash or a checksum calculated over the service API 178 and calculated over one or more of the client identity 174 and the API time-to-live 176. The API signature 172 may further be based on an identity of the UE 152, for example an IP address, an electronic serial number (ESN), a mobile subscriber identification (MSID), or some other identity. In an embodiment, the service security token 170 is encrypted. The client identity 174 identifies the client application 160 that requested the service security token 170. The client identity 174 may further identify the UE 152, for example identifying an IP address, an ESN, a MSID, or other identity of the UE 152. The API time-to-live 176 may be a time at which the service security token 170 is deemed out-of-date or expired. The API time-to-live 176 may avoid malware copying the service security token 170 and invoking the service application 184 using the service security token 170 by spoofing the authorized UE 152.

The UE 152 sends a request via the eNB 162 and the network 104 to the service application 184 to have a software service performed on its behalf by the service application 184 executing in the software container 182 on the host computer 180. The software service may be access to streaming content such as video or such as premium content. The software service may be access to an interactive application such as a gaming application or some other application. For example, the UE 152 sends a message comprising the service API 178 invocation along with the service security token 170. In an embodiment, the service API 178 invocation includes the service security token 170 as a parameter of the invocation.

The service application 184 examines the service security token 170 received from the UE 152 and determines if it is valid or invalid. If the service application 184 determines that the service security token 170 is invalid, the service application 184 rejects the service API 178 invocation. If the service application 184 determines that the service security token 170 is valid, the service application 184 performs the requested service API 178 invocation, for example providing streaming content or providing gaming services to the client application 160 on the UE 152.

The service application 184 may perform at least part of the verification of the service security token 170 itself. The service application 184 may further delegate some of the verification of the service security token 170 to the service token broker application 166. The service application 184 may decrypt the service security token 170 if it was provided in an encrypted form by the service token broker application 166 to the UE 152. The service application 184 may confirm that the client identity 174 in the service token 170 agrees with an identity of the client application 160 that may be provided in the service API 178 or that may be included in the message in which the service API 178 is embedded. If the client identity 174 does not agree with the identity of the client application 160 provided in the service API 178 and/or included in the service API 178, the service application 184 may reject the service API 178 invocation.

The service application 184 may calculate a confirmation signature over the service API 178 received from the UE 152 and over one or more portions of the service security token 170 (e.g., over the client identity 174 and/or the API time-to-live 176) and compare the confirmation signature to the API signature 172 stored in the service security token 170 included in the service API 178 sent to the service application 184. If the signatures do not agree, the service application 184 may reject the service API 178 invocation. The service application 184 may compare the API time-to-live 176 to a system time and reject the service API 178 invocation if the API time-to-live 176 is out-of-date or expired, based on a predefined time threshold.

In an embodiment, the service security token 170 comprises a unique identity or quasi-unique identity. The service application 184 may further verify the service API 178 by communicating with the service token broker application 166 to verify the authenticity of the service security token 170, for example by sending the unique identity or quasi-unique identity of the service security token 170 to the service token broker application 166 to ask the service token broker application 166 to confirm that it maintains the original service token 168. If the service token broker application 166 does not confirm the match of the service security token identity to a corresponding service token 168, the service application 184 may reject the service API 178 invocation.

In an embodiment, the service token broker application 166 may store information in the service token 168 that is not included in the copied service security token 170, for example an identity of the UE 152 and/or an identity of a subscriber account associated with the service application 184. The service token broker application 166 may be requested by the service application 184 to confirm that the identity of the UE 152 and/or the subscriber associated with the service application 184 agrees with the corresponding information stored in the service token 168 maintained by the service token server 164 and not included in the service security token 170. This may provide additional security and a further obstacle to a bogus device attempting to spoof the UE 152 and/or to break the security mechanism of the service security token 170 and the service API 178.

It is understood that the UE 186 may likewise interact with the service token broker application 166 and the service application 184 in substantially the same way as the UE 152, with the exception that the UE 186 communicates with the network 104 via a wired link rather than with a wireless link via the eNB 162. In an embodiment, the UE 186 may communicate wirelessly with a short range radio transceiver, such as a WiFi access point or a Bluetooth® access point. The UE 186 may comprise a memory, a client application, a copy of the service security token, and a service API that are substantially similar to those discussed above with reference to UE 152.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 4:
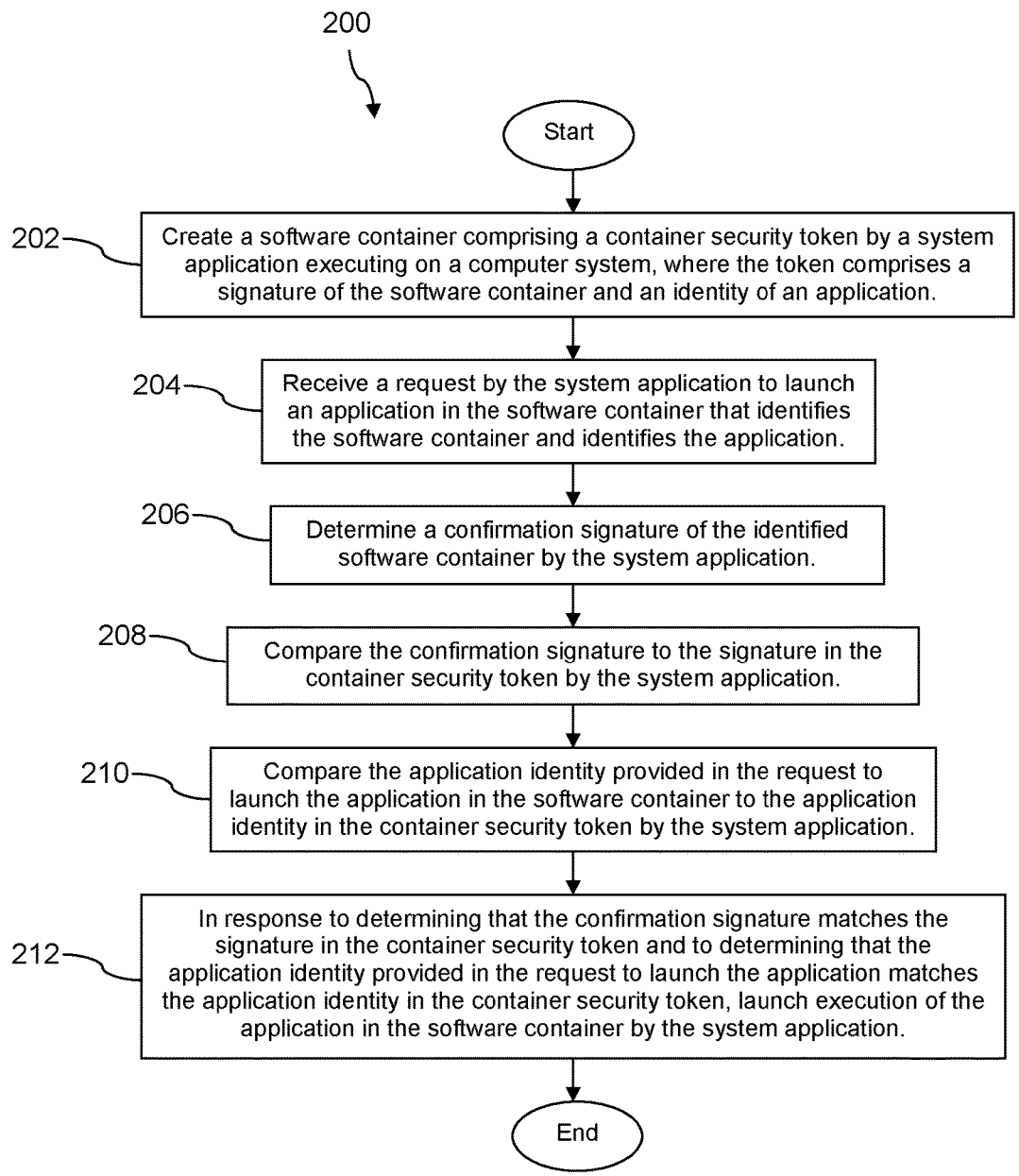
FIG. 4 is a flow chart of a method according to an embodiment of the disclosure.

Turning now to FIG. 4, a method 200 is described. At block 202, a system application executing on a computer system creates a software container comprising a container security token, where the token comprises a signature of the software container and an identity of an application. The system application may be an operating system that executes on the computer system and provides an execution environment for other applications that execute on the computer system. As known by one skilled in the art, operating systems generally provide access of applications to resources of the computer system, for example to processing cycles of a processor or central processing unit (CPU), to memory, to input/output devices, to communication interfaces, and to other resources. The operating system may provide this access via operating system application programming interfaces (APIs) or via system calls. The operating system may provide higher level computer system constructs such as software containers and data structures. The signature may be calculated or determined over the software container by the system application as described further above. The software container initially created by the computer system may be referred to as an inactive software container and may comprise a data structure or object that may be used by the system application to create an active software container and to execute an application in the active software container.

At block 204, the system application receives a request to launch an application in the software container that identifies the software container and identifies the application. The request may comprise a structure or object that comprises an inactive software container that comprises the container security token. If the container security token is encrypted, the system application may decrypt the container security token. At block 206, the system application determines a confirmation signature of the identified software container. For example, the system application determines the confirmation signature based on the software container, for example over an inactive software container. Calculation and/or determination of signatures and confirmation signatures are described further above. At block 208, the system application compares the confirmation signature to the signature in the container security token.

At block 210, the system application compares the application identity provided in the request to launch the application in the software container to the application identity in the container security token. At block 212, in response to determining that the confirmation signature matches the signature in the container security token and to determining that the application identity provided in the request to launch the application matches the application identity in the container security token, the system application launches execution of the application in the software container. If either the confirmation signature disagrees with the signature stored in the container security token or the application identity provided in the request to launch or activate the application disagrees with the application identity stored in the container security token, the system application may reject the request to launch the application in the software container.

Figure 5:
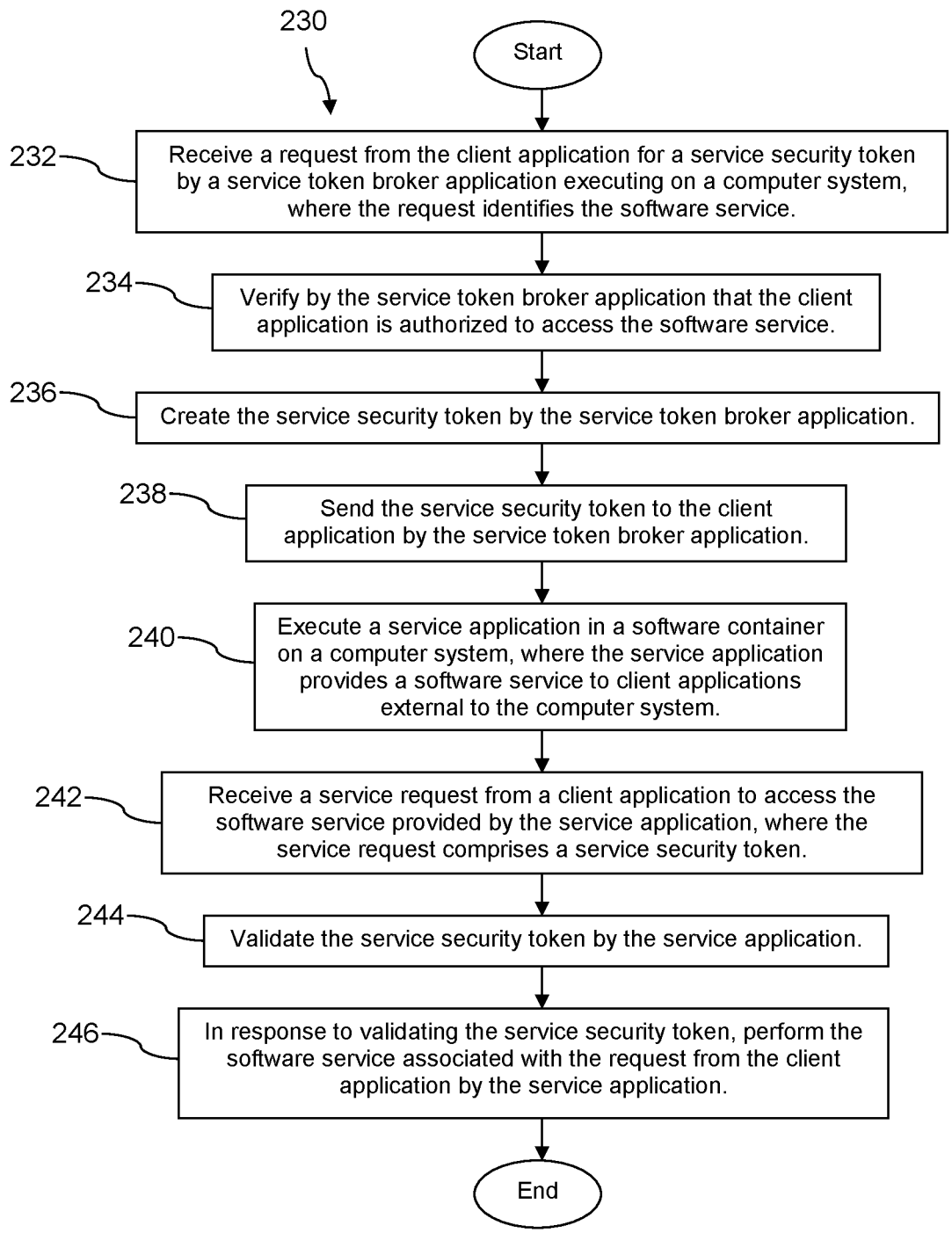
FIG. 5 is a flow chart of another method according to an embodiment of the disclosure.

Turning now to FIG. 5, a method 230 is described. At block 232, a service token broker application receives a request from the client application for a service security token, where the request identifies the software service. At block 234, the service token broker application verifies that the client application is authorized to access the software service. At block 236, the service token broker application creates the service security token. In an embodiment, the service token broker application encrypts the service security token. At block 238, the service token broker application sends the service security token to the client application.

At block 240, a computer system executes a service application in a software container, where the service application provides a software service to client applications external to the computer system. At block 242, the computer system receives a service request from a client application to access the software service provided by the service application, where the service request comprises a service security token. In an embodiment, the service security token is encrypted, and the service application decrypts the service security token. At block 244, the service application validates the service security token. At block 246, in response to validating the service security token, the service application performs the software service associated with the request from the client application.

Figure 6:
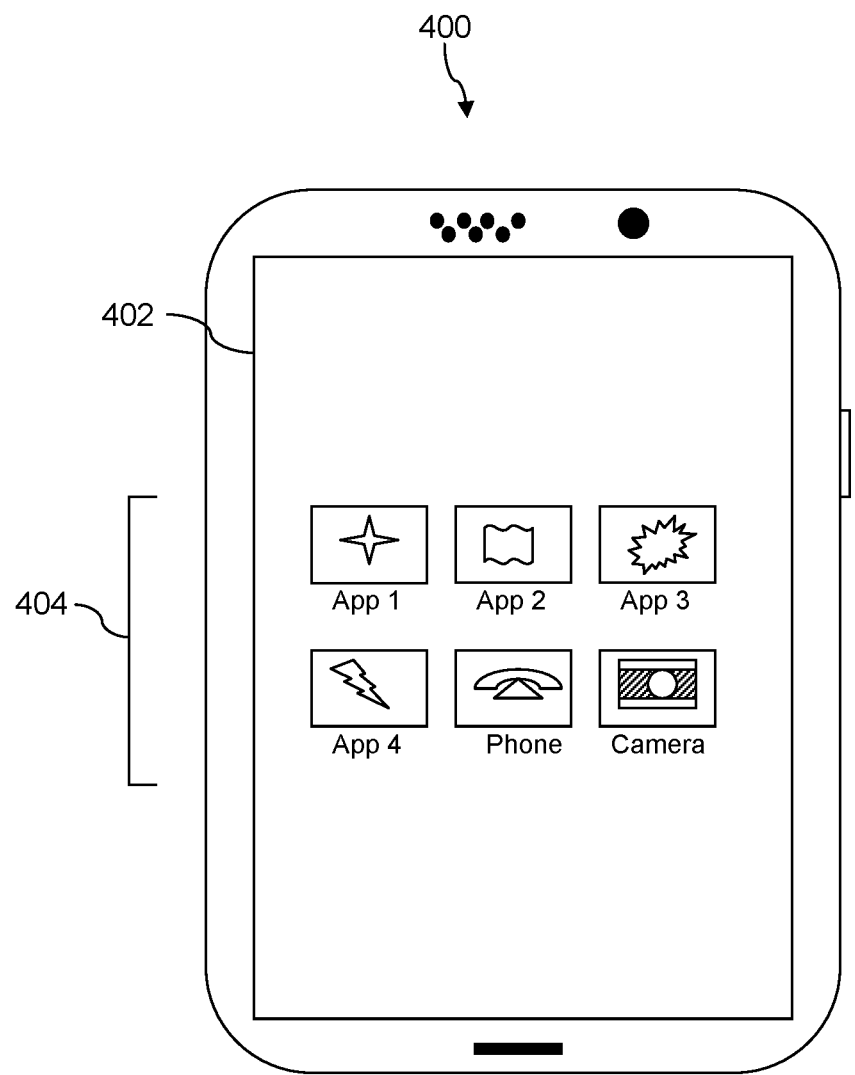
FIG. 6 is an illustration of a user equipment (UE) according to an embodiment of the disclosure.

FIG. 6 depicts the user equipment (UE) 400, which is operable for implementing aspects of the present disclosure, but the present disclosure should not be limited to these implementations. For example, the UE 152 described above may be implemented in this form. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
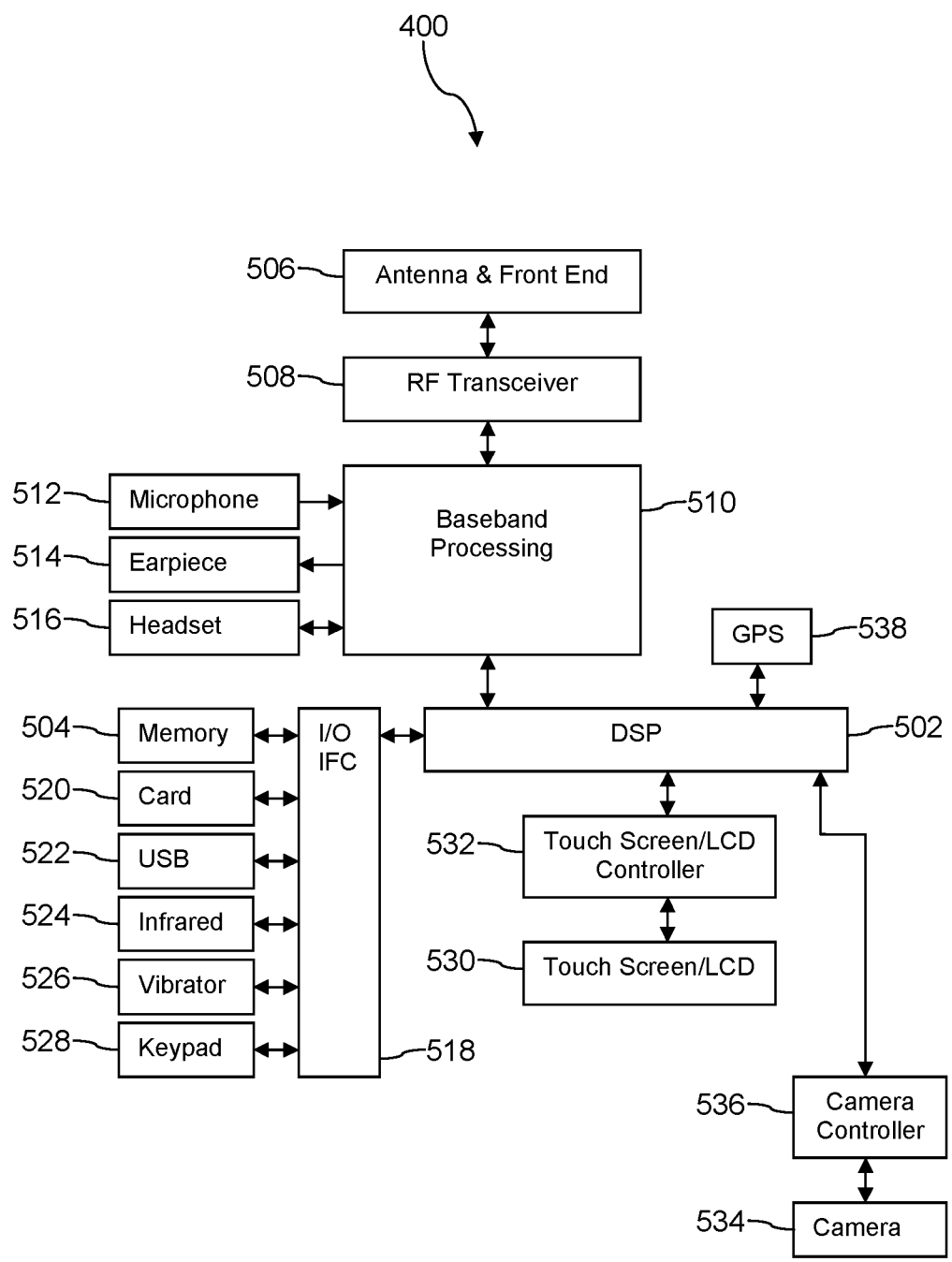
FIG. 7 is a block diagram of a hardware architecture of a user equipment according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
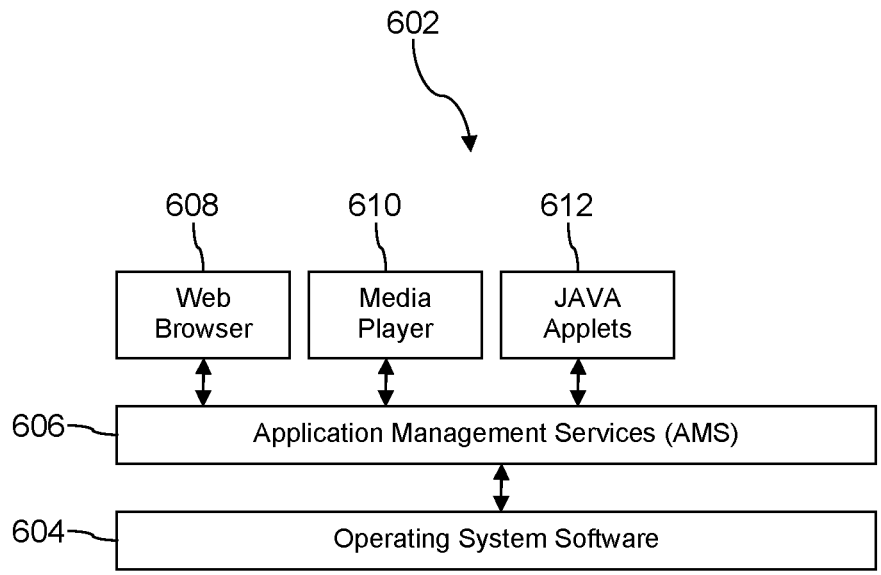
FIG. 8A is a block diagram of a software architecture of a user equipment according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
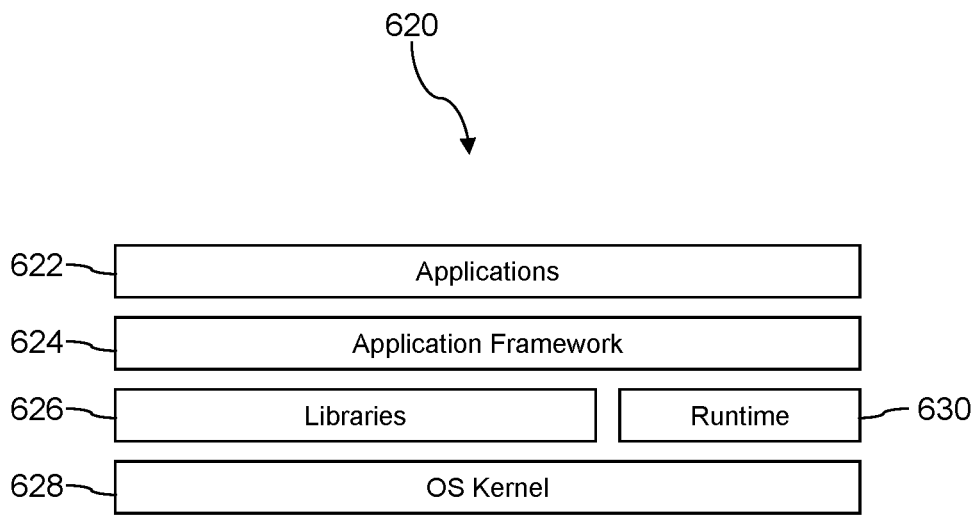
FIG. 8B is a block diagram of another software architecture of a user equipment according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
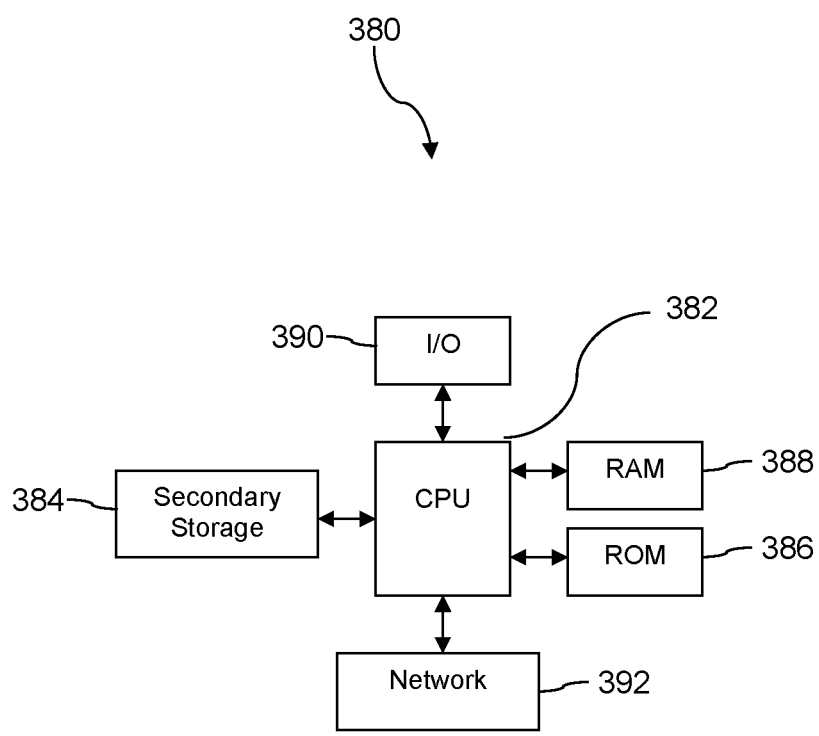
FIG. 9 is a block diagram of a computer system according to an embodiment of the disclosure.

FIG. 9 illustrates a computer system 380 suitable for implementing one or more embodiments disclosed herein. For example, the work stations 102, the host computers 106, the service token server 164, and the host computer 180 may be implemented as computer systems in a form similar to the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388.

In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing an execution environment with a software container, each step of the method performed by a system application executing on a first computer system, the method comprising:

receiving a request for a software container, where the request for the software container is received from a second computer system, where the second computer system is different from the first computer system;

creating a software container comprising a container security token, where the token comprises a signature of the software container and an identity of an application to be executed in the software container;

sending the software container comprising the container security token to the second computer system;

receiving a request from the second computer system to launch an application in the software container, wherein the request comprises the software container and identifies the application in the software container;

determining a confirmation signature of the identified software container;

comparing the confirmation signature to the signature in the container security token;

comparing the application identity provided in the request to launch the application in the software container to the application identity in the container security token; and in response to determining that the confirmation signature matches the signature in the container security token and to determining that the application identity provided in the request to launch the application matches the application identity in the container security token, launching execution of the application in the software container on the second computer system.

2. The method of claim 1, wherein the signature of the software container is a hash calculated over the software container, determining the confirmation signature comprises calculating a confirmation hash over the software container identified in the request, and comparing the confirmation signature to the signature in the container security token comprises comparing the two hash values.

3. The method of claim 1, wherein the signature of the software container is a checksum calculated over the software container, determining the confirmation signature comprises calculating a confirmation checksum over the software container identified in the request, and comparing the confirmation signature to the signature in the container security token comprises comparing the two checksum values.

4. The method of claim 1, wherein the token further comprises a time-to-live value and further comprising comparing the time-to-live value in the container security token to a current system time by the system application prior to launching execution of the application in the software container.

5. The method of claim 4, further comprising comparing the time-to-live value in the container security token to the current system time periodically by the system application after launching execution of the application in the software container.

6. The method of claim 5, further comprising terminating execution of the application in the software container and destroying the software container when the time-to-live value is determined to be exceeded.

7. The method of claim 5, further comprising prompting the application to invoke an application programming interface (API) of the system application to extend the time-to-live value stored in the container security token.

8. A computer system, comprising:
a processor;
a non-transitory memory; and
a system application stored in the non-transitory memory that, when executed by the processor,
receives a request to create a software container, creates the software container, generates a signature of the software container, creates a container security token that comprises the signature and an identity of an application to be executed in the software container, embeds the container security token in the software container, returns the software container with the embedded container security token, receives an application launch request to launch an application in the software container, where the application launch request comprises the software container and identifies the application in the software container, determines a confirmation signature of the software container provided by the application launch request, compares the confirmation signature to the signature of the container security token in the software container provided by the application launch request, determines that the confirmation signature and the signature of the container security token in the software container provided by the application launch request match, compares the application identity provided in the application launch request to the application identity in the container security token, and responsive to determining the signatures match and to determining that the application identity provided in the application launch request matches the application identity in the container security token, launches, on the second computer system, the application in the software container provided by the application launch request.

9. The computer system of claim 8, wherein the system application further:

receives a request to create a second software container, creates the second software container, generates a second signature of the second software container, creates a second container security token that comprises the second signature, embeds the second container security token in the second software container, returns the second software container with the embedded second container security token, receives a second application launch request to launch a second application in the second software container, where the second application launch request comprises the second software container, determines a second confirmation signature of the second software container provided by the second application launch request, compares the confirmation signature to the second signature of the second container security token in the second software container provided by the second application launch request, determines that the second confirmation signature and the second signature of the second container security token in the second software container provided by the second application launch request do not match, and responsive to determining the signatures do not match rejects the second application launch request and does not launch the second application in the second software container provided by the second application launch request.

10. The computer system of claim 8, wherein the signature of the software container is one of a hash value determined over the software container or a checksum determined over the software container.

11. The computer system of claim 8, wherein the system application further encrypts the signature and the container security token comprises the encrypted signature.

12. The computer system of claim 8, wherein the system application further:

creates a time-to-live value associated with the software container, wherein the container security token further comprises the time-to-live value, compares the time-to-live value stored in the signature of the container security token in the software container provided by the application launch request to a current time maintained by the computer system, and determines that the time-to-live value does not exceed the current time.

13. The computer system of claim 12, wherein the system application provides an application programming interface to request extension of the time-to-live value in the signature of the container security token in the software container.

14. The method of claim 1, wherein the software container sent to the second computer system is an inactive software container that comprises the container security token.

15. The method of claim 14, wherein the inactive software container comprises information about resource allocations.

16. The method of claim 14, wherein the inactive software container comprises configuration information.

17. The method of claim 8, wherein the software container is an inactive software container that comprises the container security token.

18. The method of claim 17, wherein the inactive software container comprises information about resource allocations.

* * * * *